United States Patent [19]
Perilhou et al.

[11] 3,947,626
[45] Mar. 30, 1976

[54] METHOD OF RECORDING CINEMATOGRAPHIC IMAGES FROM AN ELECTRIC SIGNAL PRODUCED BY SCANNING IMAGE SEQUENCES TO BE DISPLACED AND DEVICE FOR CARRYING OUT THIS METHOD

[75] Inventors: Jean Robert Perilhou, Bourg-la-Reine; Michel Jacques Siméon, Aulnay sur-Seine Bois; Dominique Yves Marie Taupin, Paris, all of France

[73] Assignee: U.S. Philips Corporation, New York, N.Y.

[22] Filed: Mar. 27, 1974

[21] Appl. No.: 455,240

[30] Foreign Application Priority Data
Mar. 30, 1973 France .............................. 73.11532

[52] U.S. Cl. ........ 178/6.6 R; 178/6.6 B; 178/6.7 R; 346/74 EE
[51] Int. Cl.[2] ............................................ H04N 1/24

[58] Field of Search ........... 178/6.6 R, 6.6 A, 6.6 B, 178/6.7 R, 6.7 A; 346/74 EE, 74 EH

[56] References Cited
UNITED STATES PATENTS

| | | | |
|---|---|---|---|
| 3,553,718 | 1/1971 | Schierhorst et al. ............. | 178/6.6 R |
| 3,624,661 | 11/1971 | Shebanow ...................... | 346/74 EE |
| 3,836,981 | 9/1974 | Kusano et al. .................. | 346/74 EE |
| 3,846,801 | 11/1974 | DuMont et al .................. | 178/6.6 R |

*Primary Examiner*—Raymond F. Cardillo, Jr.
*Attorney, Agent, or Firm*—Frank R. Trifari; Simon L. Cohen

[57] ABSTRACT

On a record carrier moved at a velocity $v = (d . m)$ a signal is recorded which is formed by scanning at a rate of $m$ images of $n$ lines each per second. For each scanned image $p$ partial images having $x$ elements per line are recorded. The partial images together reform the complete scanned image which contains $(p . x)$ elements per line.

9 Claims, 2 Drawing Figures

METHOD OF RECORDING CINEMATOGRAPHIC IMAGES FROM AN ELECTRIC SIGNAL PRODUCED BY SCANNING IMAGE SEQUENCES TO BE DISPLACED AND DEVICE FOR CARRYING OUT THIS METHOD

The invention relates to a method of recording images fron an electric signal which is obtained by scanning a sequence of images at a rate of $m$ images per second, each image comprising $n$ lines. The invention also relates to a device for carrying out said method.

As is known, in particular in television the video signals frequently are to be stored for various purposes. One of the devices used for this purpose utilizes a video signal for forming pictures on the screen of a television receiver, a cinematograph camera being disposed in front of the screen. Such a system is bulky; moreover, the use of photographic techniques means that the exposed film must be developed and hence is not directly and immediately ready for use.

In the last few years it has become possible to record images in the form of a video signal on a magnetic tape. The video tape recording device used for this purpose has many advantages in respect of the quality of the images reproduced from the magnetic tape. In some cases, however, said advantages are partly cancelled by the high price, the bulkiness and the required degree of accuracy of adjustment of the apparatus, which uses the relative movements of the information carrier and of a rotating drum which carries the record and playback heads, for processing frequencies in the order of a few MHz generally used in television.

Furthermore electrosensitive paper is known which for example includes a metal layer which can be burnt off by contact with an electrode to which an electric current is supplied, so that in accordance with the choice of the crrent strength and of the thickness of the metal layer the burnt spots can be made visible. Instead of opaque paper a transparent base may be used. The metal surface in contact with the electrode surface is removed by burning over an area the size of which depends upon the strength of the current flowing through said electrode. On Feb. 2, 1973 Applicant filed an application in France under Ser. No. 73 03745, corresponding to U.S. patent application Ser. No. 436,529, filed Jan. 25, 1974 which relates to a write head for a graphic recording apparatus of a design permitting at least four electrodes per millimeter to be aligned in a direction at right angles to the travelling direction of the record carrier.

It is an object of the present invention to utilize the possibilities offered by a write head of the abovedescribed type in conjunction with a recording tape coated with a thin opaque layer of an electrosensitive metal and to provide a simple method and an apparatus for direct recording of cinematographic images, using an electric signal obtained by scanning the image sequences to be played back.

The method according to the invention is characterized in that, starting from the signal which corresponds to a single total image of the image sequence, $p$ separate partial images, each partial image comprising $x$ image elements per line are recorded on a record carrier. The $p$ partial images together reconstitute the entire scanned total image having $(p.x)$ image elements per line. The $p$ recorded partial images are relatively shifted on the record carrier so that the $p$ partial images which correspond to the sequentially scanned total images succeed one another on the record carrier and the recorded $p^{th}$ partial image corresponding to a given scanned total image concides on the record carrier with, and is completed by, the $(p-1)^{st}$ to $1^{st}$ partial images which correspond respectively to the $(p-1)$ partial images which are scanned after the said given total image in the image scanning sequency.

As used in this specification the terms $p^{th}$, $(p-1)^{st}$ indicate ordinal numbers such as "fifth" ($5^{th}$) and "first" ($1^{st}$).

Assuming for example that the electric signal which corresponds to a complete scanned total image causes four partial images to be recorded and that the fifth total image of a sequence to be played back has just been recorded on the record carrier. Under these conditions the area extending across the carrier encompassing the third total image contains elements of the second and fourth total images while other similar areas contain elements of four consecutive total images.

Thus some of the total images formed on the record carrier contain information of four scanned total images. The frequency at which the total images are successively formed on the record carrier, however, remains equal to $m$ images per second.

The method according to the invention is particularly suitable for forming cinematographic images from a television signal or video signal. The term cinematographic images as used hereinafter shall include visible (although not necessarily intelligable) images sequentially recorded in a strip shaped carrier representing objects at sequential time periods. In this event the field frequency is 50 fields per second (25 total images or frames per second); the recorded total images represent the whole of the movements performed during four television fields (four partial images), which corresponds to 12.5 total images or frames per second; experience has shown that cinematographic reproduction at a speed of 12 total images or frames per second provides satisfactory reproduction of motion. Moreover the sharpness of the recording depends only upon the number $x$ of elements chosen for a partial image.

According to the invention a device for carrying out the abovedescribed method is characterized in that it comprises:

a. $p$ record heads which each have $x$ ordered electrodes arranged in a line which extends at right angles to the longitudinal direction of the record carrier, while the corresponding electrodes of the $p$ record heads are not placed in a line parallel to the longitudinal direction of the record carrier and the distance between the centers of the record heads is equal to the center distance $d$ of the total images to be recorded, b. means for moving the record carrier at a velocity $v = (d.m)$ in the direction from the $p^{th}$ to the first record head, c. switching means adapted to apply to the electrodes parts of the signal indicating the opacity of successive partial image elements of a line from an image to be recorded, the arrangement being such that successively $x$ groups which each comprise $p$ electrodes of the same order are selected from the $x$ electrodes of each of the $p$ record heads, whereupon in each selected group the electrodes are sequentially selected which belong to the first, second, ..., $p^{th}$ heads respectively, the direction of selection of the $x$ groups being determined by the direction in which the lines of the image to be recorded are scanned.

An embodiment of the invention will now be described, by way of example, with reference to the accompanying diagrammatic drawings, in which.

As was stated above, the present invention utilizes the possibility offered by a record head of the type described in our co-pending U.S. application Ser. No. 436,529, filed Jan. 25, 1974. The said application describes a record head construction which enables a large number of electrodes to be aligned in a direction at right angles to the direction of movement of the record carrier. Moreover these electrodes may be used to obtain recordings in the form of spots or pinholes which in accordance with an electric voltage applied to the electrodes are burnt in the metal coating of a tape-shaped record carrier.

Figure 1:
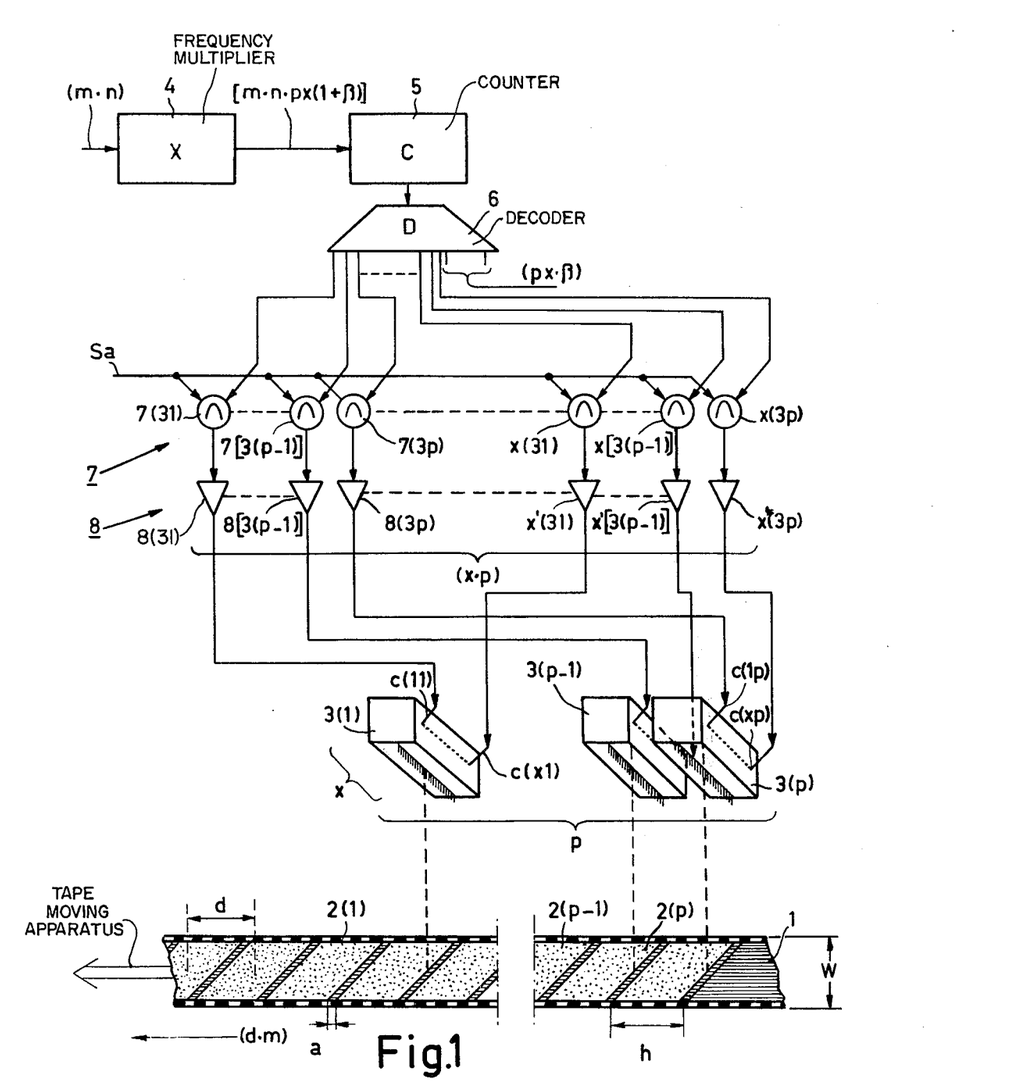
FIG. 1 is a block diagram of a system for carrying out the method according to the invention.

Referring now to FIG. 1, reference numeral 1 denotes a record carrier. This carrier preferably is a tape made of polyethylene terephathalate (known under the trade name Mylar) which is coated with a thin but opaque film of a readily fusible metal, for example aluminium, zinc or cadmium (or alloys of these metals). The resulting record carrier has perforations in its edges (not shown) which enables the carrier to be moved at a velocity $v = (d.m)$, where $d$ is the distance between the centers of the successive total images which constitute a cinematographic film. One of these recorded total images is denoted by 2(1). In the formula $v = (d.m)$, $m$ is the number of total images per second which are scanned for representation by the electric signal. The center distance between recorded total images is actually defined by the relationship:

$$d = w . \delta . (\alpha + 1),$$

where $w$ is the width of the recorded total image, $\delta$ = a coefficient which determines the height of the recorded total image ($h = w . \delta$), and $\alpha$ defines the relationship between the duration of the frame flyback signal and the proper time for scanning the total image (for, as is known, the frame flyback signal is included in the scanning signal having a scanning time $1/m$ of a total image of a sequence to be displayed).

From the above it will be clear that on the carrier the successively recorded images are separated by "white" parts. Because in actual fact the center distance between adjacent total images is equal to $d$, the height $h$ of the total image is equal to $$\frac{d}{\alpha + 1}$$

and the height $a$ of the "white" part is equal to $$\frac{d \cdot \alpha}{\alpha + 1}.$$

Above the rear lines of the $p$ total images 2(1) to 2($p$) recorded on the carrier are shown $p$ record heads 3(1) to 3($p$) of the type described in the abovementioned patent application. According to said application each head comprises $x$ electrodes placed in a line which extends at right angles to the longitudinal direction of the record carrier 1. In FIG. 1 the record heads 3(1) to 3($p$) are shown spaced by a large distance from the record carrier 1 so as to make visible the "write points" of the electrodes, which in actual fact are in contact with said carrier; moreover only the connections of the first and $x^{th}$ electrodes of each head are shown (c(11) and c($x$1) for the head 3(1)).

Figure 2:
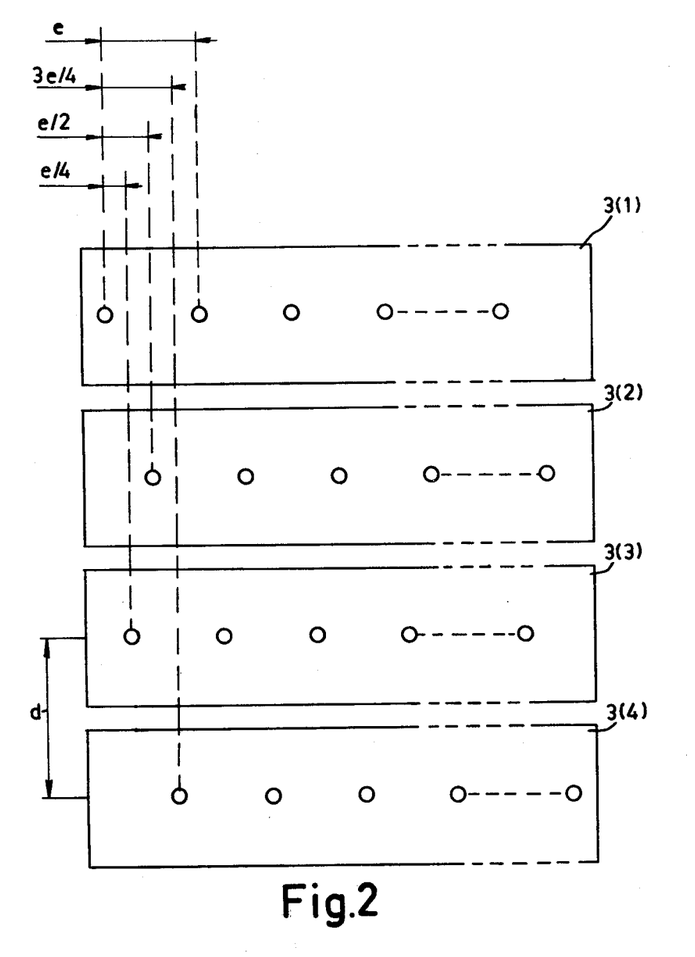
FIG. 2 shows on an enlarged scale the arrangement of the electrodes of the record heads according to an embodiment of the invention.

FIG. 2 shows on an enlarged scale the arrangement of the electrodes of the record heads of a device having four heads 3(1), 3(2), 3(3) and 3(4). The electrodes of each of the four heads are spaced from one another by a distance $e$, however, the electrodes of, for example, the head 3(1) are transversely shifted by distances $e/4$, $2e/4$ and $3e/4$ relative to the corresponding electrodes of the heads 3(3), 3(2) and 3(4) respectively. Other arrangements may be used, for example the electrodes of the head 3(1) may be shifted by distances $e/4$, $2e/4$ and $3e/4$ relative to the electrodes of the heads 3(2), 3(3) and 3(4) respectively. The purpose of the arrangement is to increase the information content in proportion to the number of record heads of the device (four in this case) by recording four partial images (in the case under consideration) from the signal which corresponds to a total image to be recorded on the record carrier. The above will be explained more fully hereinafter.

Referring to FIG. 1 again, it will be seen that each of the $p.x$ electrodes ($p$ heads and $x$ electrodes per head) is capable of receiving a signal $sa$ via an associated electrode amplifier from a group of amplifiers 8 and via an associated AND gate from a group of AND gates 7. Each AND gate can be opened by one of the output signals of a decoder circuit 6.

It was stated above that the total image sequences to be displayed are scanned total image by total image at a rate of $m$ total images per second, each total image having $n$ lines; the line scanning frequency hence is equal to $(m.n)$. A pulse signal at the frequency $(m.n)$ is applied to a frequency multiplier 4 which multiplies it by $[p.x(1 + \beta)]$, where $(p.x)$ is the total number of electrodes. In this expression, $\beta$ is the ratio between the duration of the line flyback signal (that is the time which elapses between the end of the scanning of a line and the beginning of the scanning of the next line) and the duration of scanning a line.

The pulse signals of frequency $[m.n.p.x (1 + \beta)]$ are applied to a counter 5 the output of which is connected to the decoder 6. Decoder 6 is a common type of decoder such as those used in time multiplex transmission systems wherein each successive output of a pulse counter energizes a different one of the decoder output terminals. The counter 5 is a ring counter having $[p.x.(1 + \beta)]$ positions, so that during the scanning of a line and at the first $(p.x)$ positions the gates of the said group of AND gates 7 are sequentially opened to permit the passage of the signal $sa$. The connections between the counter, decoder and gates shown in FIG. 1 are such that first the first group of electrodes of the record heads 3(1) to 3($p$) are energized, then the second group of electrodes . . . , and finally the $x^{th}$ electrodes. As indicated in the drawings, the electrodes of each recording head are ordered and a group of electrodes may be defined as the electrodes of a particular order on all the recording heads. Thus the scanning signal is sequentially applied to the $(p.x)$ electrodes of the $p$ record heads by successive selections of the $p$ electrodes of each group in the successively selected $x$ groups of $p$ electrodes each.

In FIG. 1 the AND gates 7(31), 7 [3 $(p-1)$], 7($3p$), $x$(31), $x$ [3 $(p-1)$] and $x$(3$P$) and the amplifiers 8(31), 8 [3 $(p-1)$], 8($3p$), $x'$(31), $x'$ [3 $(p-1)$] and $x'$($3p$) are associated with the first electrodes and the $x^{th}$ electrodes of the heads 3(1), 3($p-1$) and 3(p) respectively. When all the electrodes have been selected the counter is advanced $(p.x.\beta)$ positions, that is to say for the duration of the flyback signal, returning to the initial position 0 for recording the next line.

Thus each total image of the sequence to be displayed is recorded on the record carrier 1 in the form of $p$ partial images (for example 2(1), . . . , 2($p$.1), 2($p$)). Superposition of these partial images provides the initial total image owing to the staggered arrangement of the electrodes, as was explained with reference to FIG. 2. Each partial image comprises $n$ lines and is recorded with a size the width of which is determined by the distance between the first electrode of the head 3(1) and the $x^{th}$ electrode of the head 3($p$); the height of the total image is equal to $d/(\alpha + 1)$, as stated above.

When $p$ partial images which correspond to the first scanned image have been recorded and the record carrier has advanced a distance $a$ (during the flyback signal), where $a$ is equal to $$\frac{d\alpha}{\alpha + 1},$$

as stated above, the device is ready to record $p$ partial images of the second scanned total image; the head 3(1) now is located directly over the first line of the second partial image which corresponds to the first scanned total image, the head 3($p-1$) is located over the $p^{th}$ partial image which corresponds to the first scanned total image and the head 3($p$) is located over a blank part of the record carrier which corresponds to the position of the first line of the $(p+1)^{st}$ partial image recorded on the carrier. This "interlacement" of the partial and total images yet to be is illustrated in the following Table which is based on a device having four record heads.

TABLE

|  | recorded total image elements; the digit indicates the ordinal number of the images to be recorded in the form of the electric signal. |
| --- | --- |
| first partial image recorded on the carrier | 1  1  1  1  1------<br>1  1  1<br>1  1<br> |
| second partial image recorded | 2  1 2  1  2 1 2 1 2---- |
| third partial image recorded on the carrier | 312    312  312  3-  3------<br>        12<br>312    312  312  3 |
| fourth partial image recorded on the carrier | 42314231423142314------<br>423142314<br>42314 |
| fifth partial image recorded on the carrier | 53425342534253425------<br>534253425<br>53425 |
| sixth partial image recorded on the carrier | 64536453645364536------<br>645364536<br>64536 |
| seventh partial image recorded on the carrier | 75647564756475647------<br>756475647<br>75647 |
| eighth partial image recorded on the carrier 2 | 86758675867586758------<br>867586758<br>86758 |
| ninth partial image recorded on the carrier | 97869786978697869------<br>978697869<br>97869 |

TABLE

SCANNING SEQUENCE OF PARTIAL IMAGES (underlined numbers $\underline{1}_a$ $\underline{1}_e$ $\underline{1}_i$ $\underline{1}_b$ $\underline{1}_f$ $\underline{1}_j$

TABLE-continued
SCANNING SEQUENCE OF PARTIAL IMAGES

| indicate recording electrodes) (electrode sequence shown by letters) | $1_c$ $1_o$ $1_k$ $1_d$ $1_h$ $1_l$ |
|---|---|
| Second Partial Image Recorded | 1 1 1<br>2 1 2 1 2 1<br>12 12 12<br>2 1 2 1 2 1<br>2 2 2 |
| Third Partial Image Recorded | 1 1 1<br>2 1 2 1 2 1<br>312 312 312<br>231 231 231<br>3 2 3 2 3 2<br>3 3 3 |
| Fourth Partial Image Recorded (First Total Image Recorded) | 1 1 1<br>2 1 2 1 2 1<br>312 312 312<br>423142314231<br>342 342 342<br>4 3 4 3 4 3<br>4 4 4 |
| Fifth Partial Image Recorded (First Partial Image of Second Total Image Recorded) | 1 1 1<br>2 1 2 1 2 1<br>312 312 312<br>423142314231<br>534253425342<br>453 453 453<br>5 4 5 4 5 4<br>5 5 5 |
| Sixth Partial Image Recorded | 1 1 1<br>2 1 2 1 2 1<br>312 312 312<br>423142314231<br>534253425342<br>645364536453<br>564 564 564<br>6 5 6 5 6 5<br>6 6 6 |
| Seventh Partial Image Recorded | 1 1 1<br>2 1 2 1 2 1<br>312 312 312<br>423142314231<br>534253425342<br>645364536453<br>756475647564<br>675 675 675<br>7 6 7 6 7 6<br>7 7 7 |
| Eighth Partial Image Recorded (Second Complete Image Recorded) | 1 1 1<br>2 1 2 1 2 1<br>312 312 312<br>423142314231<br>534253425342<br>645364536453<br>756475647564<br>867586758675<br>786 786 786<br>8 7 8 7 8 7<br>8 8 8 |
| Ninth Partial Image Recorded (First partial Image of third Total Image Recorded) | 1 1 1<br>2 1 2 1 2 1<br>312 312 312 .<br>423142314231<br>534253425342<br>645364536453<br>756475647564<br>867586758675<br>978697869786<br>897 897 897<br>9 8 9 8 9 8<br>9 9 9 |

From the Table the following will be clear:

1. To begin with the $p^{th}$ partial image (that is the fourth partial image in the case under consideration) the displayed partial image obtains the information content which is determined by the number of electrodes ($p.x$), 2. the display frequency of the recorded movements corresponds to the scanning frequency of the partial image sequences to be displayed, 3. there is "interlacement" of the $p^{th}$ order of the partial images (of the $4^{th}$ order, in the case under consideration).

(It will be seen that the Table uses the arrangement shown in FIG. 2).

The device is particularly suitable for recording television signals. As a matter of fact, the construction of the record heads as described in our abovementioned copending patent application enables four electrodes to be aligned per millimeter, which means a pitch of 250 $\mu$m, and the tips of these electrodes may be pointed so as to trace line sections of the order of one quarter of this pitch, that is between 60 and 70 $\mu$m, while the device comprises four record heads.

If the record carrier used has a width of for example 50 mm, each record head may comprise 160 electrodes, resulting in a total image the width of which is of the order of 40mm. The total image may be slightly shifted transversely on the tape to allow space along one edge for a sound track (the sound track may be recorded by melting the metal coating by means of a recording knife which is mechanically moved after the manner of a pickup stylus in variable area recording). In the case of four record heads the displayed total image comprises 640 elements, resulting in a highly acceptable image.

The gradation of the transparence obtained at the various marked points on the metallic coating of the carrier follows the modulation of the video signal which is sequentially applied to the electrodes.

However, in this case (scanning at 50 fields per second at a rate of 2 interlaced fields per total image, that is 25 total images per second) a completely recorded total image actually represents the whole of the movements which occur during four television fields, that is to say two total images, which means during 1/12.5 second. Thus at the output of the device a sequence of total images visible by transmission will immediately be available which are entirely comparable to photographically recorded total images. Projection at a rate of 50 total images per second may immediately take place on a screen, which may if desired be very large, in a particularly simple manner by using an objective lens and a flash bulb which is triggered by a mark which may be recorded simultaneously with the total image (for example at the beginning of the flyback signal). The signal of frequency ($m.n$) applied to the frequency multiplier 4 (FIG. 1) then is the line synchronizing signal and is multiplied by 4 times 160 ($1 + \beta$) at the output of the multiplier; only the first 640 positions of the counter are active.

The distance $d$ between the axes of the heads, that is the distance between the centers of the total images displayed, is of the order of 38 mm while the height of the image is of the order of 30 mm and the record carrier moves at a speed of the order of 1.9 m per second. It should be noted that the above description is given by way of example only and that to one skilled in the art modifications are possible without departing from the scope of the invention. For example, the invention may be used for any tupe of record carrier and of recording head which together can form marks of small diameter which are "modulated" on the carrier so that they can be visible by light transmission.

What is claimed is:

1. A device for recording cinematographic images from an electrical signal provided by a television type scanner that scans the images at a frame frequncy $m$ and at a line frequency $n$ on a longitudinally moving electrosensitive tape shaped record carrier, comprising:
   a. an array of $p$ separate ordered recording carrier scanning heads arranged along the direction of motion of said record carrier and adjacent said carrier, a plurality of ordered separate electrodes in each of said heads, the electrodes of each head being aligned in a direction extending perpendicularly to the direction of motion of said carrier, the spacing between electrodes of all adjacent heads being equal to $d$, each electrode of all $p$ recording heads being located at a different distance from the longitudinal edge of said tape-shaped carrier measured in a direction perpendicular to the direction of motion of said carrier,
   b. said tape at a velocity $V = (d)(M)$, the head at the end of the array of heads that first scans said carrier hereinafter being referred to as the $p^{th}$ head, and the head at the opposite end of the array hereinafter being referred to as the first head, and
   c. switching means connected to said electrodes for sequentially selecting $x$ different groups of $p$ electrodes, each electrode of any group of electrodes having the same order as all the electrodes of said group, and for sequentially selecting each electrode of a selected group in the same order as the order of the head to which the electrode is connected.

2. Device as claimed in claim 1, wherein the distance between all adjacent electrodes of each record head is equal to $e$ and wherein the electrodes of each head are offset in a direction perpendicular to the direction of motion of said carrier through distances $$\frac{e}{p}, \frac{2e}{p}, \ldots, \frac{(p-1)e}{p}$$

relative to the electrodes of the $(p-1)$ further heads.

3. Device as claimed in claim 1, wherein said switching means comprises means for providing a pulse signal having a frequency equal to a multiple of $(m.n.p.x)$, an assembly of $(p.x)$ AND gates which receive a scanning signal and having outputs connected to the $(p.x)$ electrodes and a counter having $(p.x)$ gate opening outputs for counting the pulses of said pulse signal, said gate opening outputs of said counter being connected to inputs of said AND gates.

4. Device as claimed in claim 3, using an electrical signal whose scanning time $1/(m.n)$ of an image line also includes the duration of a line flyback period which is a fraction $\beta$ of the line scanning time proper, wherein the counter of the switching means is further provided with a group of $(p.x.\beta)$ inoperative outputs, said pulse signal frequency being equal to $[m.n.p.x(1+\beta)]$.

5. Device as claimed in claim 1, for recording cinematographic images from a television signal or a video signal, on a record carrier the width of which is at least 40 mm, wherein the device has four record heads each comprising 120 electrodes for forming traces of width between 60 μm and 70 μm on the record carrier, the spacing between successive electrodes being about 250 μm, the device further including means to move the information carrier at a velocity of about 1.9 m per second, the switching means including a frequency multiplier for producing the pulse signal for the counter and to which the line synchronizing signal is applied which is produced during the production of the video signal.

6. Device as claimed in claim 5, wherein the electrodes of the first record head are offset through distances of 250/4 μm, 500/4 μm and 750/4 μm respectively relative to the electrodes of the three remaining record heads.

7. Device as claimed in claim 6, wherein the electrodes of the first record head are shifted through a distance of 500/4 μm relative to the corresponding electrodes of the third record head and through distances of 250/4 μm and 750/4 μm respectively relative to the corresponding electrodes of the two remaining heads.

8. Method of recording cinematographic images, comprising photoelectrically scanning the images in a raster-type scan to convert said images into an electrical signal, said raster scanning being at the rate of $n$ lines per second and $m$ complete images per second, separating the electrical signal corresponding to each total image into $p$ separate partial images, each comprising $x$ image elements per line, moving a record carrier in a given direction, recording each of said image elements of a first partial image corresponding to a first complete image in a spatially separated image element position on said moving carrier that is displaced from all other image element positions of said first partial image in a direction perpendicular to the direction of motion of said carrier, said recording step further comprising assembling each of the image elements of said first partial image corresponding to said first complete image into $p$ groups of image elements and recording each group of image elements in positions on said carrier that are spaced from all other groups of image elements in a direction parallel to the direction of motion of said carrier by a distance $d$, the spacing between image elements of different groups of image elements thereby having components in directions both parallel and perpendicular to the direction of motion of carrier, continuing said recording of said image elements of said first partial image corresponding to said first complete image until $px$ image elements corresponding to said entire first partial image have been recorded, recording each partial image corresponding to said first complete image at a given frequency, said motion of said record carrier being equal to the frequency of recording said partial images multiplied by said distance $d$, recording $p$ successive partial images, thereby recording a total image, similarly recording subsequent complete images.

9. A method of recording cinematographic images as recited in claim 8, wherein said raster scan includes a vertical flyback period and wherein said step of similarly recording subsequent complete images further comprises refraining from recording said image elements during said vertical flyback period.

* * * * *

UNITED STATES PATENT AND TRADEMARK OFFICE
CERTIFICATE OF CORRECTION

PATENT NO. : 3,947,626

DATED : March 30, 1976

INVENTOR(S) : JEAN ROBERT PERILHOU ET AL

It is certified that error appears in the above-identified patent and that said Letters Patent are hereby corrected as shown below:

IN THE SPECIFICATION

Col. 1, line 44, cancel "Ser.";

Col. 6, line 15, after "image" insert --yet to be--;

line 17, cancel "yet to be--;

lines 20 through 64 cancel the TABLE;

Col. 6, lines 65 to 68 and Col. 7, lines 1 through 60 the TABLE should read as follows:

-- TABLE

SCANNING SEQUENCE OF PARTIAL IMAGES

|  | $\underline{1}a$ | $\underline{1}e$ | $\underline{1}i$ |
|---|---|---|---|
| (underlined numbers indicate recording electrodes) | $\underline{1}b$ | $\underline{1}f$ | $\underline{1}j$ |
|  | $\underline{1}c$ | $\underline{1}g$ | $\underline{1}k$ |
| (electrode sequence shown by letters) | $\underline{1}d$ | $\underline{1}h$ | $\underline{1}l$ |

UNITED STATES PATENT AND TRADEMARK OFFICE
CERTIFICATE OF CORRECTION

PATENT NO. : 3,947,626
DATED : March 30, 1976
INVENTOR(S) : JEAN ROBERT PERILHOU ET AL It is certified that error appears in the above-identified patent and that said Letters Patent are hereby corrected as shown below:

|  |  |
|---|---|
|  | 1  1  1 |
| Second Partial | $\underline{2}$ 1 $\underline{2}$ 1 $\underline{2}$ 1 |
| Image Recorded | 1$\underline{2}$  1$\underline{2}$  1$\underline{2}$ |
|  | $\underline{2}$ 1 $\underline{2}$ 1 $\underline{2}$ 1 |
|  | $\underline{2}$  $\underline{2}$  $\underline{2}$ |

-----  -----  -----  -----  -----  -----

|  |  |
|---|---|
|  | 1  1  1 |
| Third Partial | 2 1 2 1 2 1 |
| Image | $\underline{3}$12 $\underline{3}$12 $\underline{3}$12 |
| Recorded | 2$\underline{3}$1 2$\underline{3}$1 2$\underline{3}$1 |
|  | $\underline{3}$ 2 $\underline{3}$ 2 $\underline{3}$ 2 |
|  | $\underline{3}$  $\underline{3}$  $\underline{3}$ |

-----  -----  -----  -----  -----  -----

UNITED STATES PATENT AND TRADEMARK OFFICE
CERTIFICATE OF CORRECTION

PATENT NO. : 3,947,626
DATED : March 30, 1976
INVENTOR(S) : JEAN ROBERT PERILHOU ET AL It is certified that error appears in the above-identified patent and that said Letters Patent

|                                   |                  |
|-----------------------------------|------------------|
|                                   | 1   1   1        |
| Fourth Partial                    | 2 1 2 1 2 1      |
| Image Recorded                    | 312 312 312      |
| (First Total                      | 423142314231     |
| Image Recorded)                   | 342 342 342      |
|                                   | 4 3 4 3 4 3      |
|                                   | 4   4   4        |

|                                   |                  |
|-----------------------------------|------------------|
|                                   | 1   1   1        |
| Fifth Partial                     | 2 1 2 1 2 1      |
| Image Recorded                    | 312 312 312      |
| (First Partial                    | 423142314231     |
| Image of Second                   | 534253425342     |
| Total Image                       | 453 453 453      |
| Recorded)                         | 5 4 5 4 5 4      |
|                                   | 5   5   5        |

UNITED STATES PATENT AND TRADEMARK OFFICE
CERTIFICATE OF CORRECTION

PATENT NO. : 3,947,626  
DATED : March 30, 1976  
INVENTOR(S) : JEAN ROBERT PERILHOU ET AL Page 4 of 8

It is certified that error appears in the above-identified patent and that said Letters Patent are hereby corrected as shown below:

```
                          1   1   1

2 1 2 1 2 1

312 312 312

Sixth Partial            423142314231

Image Recorded           534253425342

645364536453

564 564 564

6 5 6 5 6 5

6   6   6
```

----- ----- ----- ----- ----- -----

UNITED STATES PATENT AND TRADEMARK OFFICE
CERTIFICATE OF CORRECTION

PATENT NO. : 3,947,626  
DATED : March 30, 1976  
INVENTOR(S) : JEAN ROBERT PERILHOU ET AL Page 5 of 8

It is certified that error appears in the above-identified patent and that said Letters Patent are hereby corrected as shown below:

```
                              1   1   1
                            2 1 2 1 2 1
                            312 312 312
Seventh Partial             423142314231
Image Recorded              534253425342
                            645364536453
                            756475647564
                             675 675 675
                              76 76 76
                               7   7   7
```

----- ----- ----- ----- ----- -----

UNITED STATES PATENT AND TRADEMARK OFFICE
CERTIFICATE OF CORRECTION

PATENT NO. : 3,947,626
DATED : March 30, 1976
INVENTOR(S) : JEAN ROBERT PERILHOU ET AL It is certified that error appears in the above-identified patent and that said Letters Patent are hereby corrected as shown below:

|  |  |
|---|---|
|  | 1    1    1 |
|  | 2 1 2 1 2 1 |
|  | 312 312 312 |
|  | 423142314231 |
| Eighth Partial | 534253425342 |
| Image Recorded | 645364536453 |
| (Second Complete | 756475647564 |
| Image Recorded) | 86758675<u>8</u>675 |
|  | 7<u>8</u>6  7<u>8</u>6  7<u>8</u>6 |
|  | <u>8</u> 7 <u>8</u> 7 <u>8</u> 7 |
|  | <u>8</u>   <u>8</u>   <u>8</u> |

UNITED STATES PATENT AND TRADEMARK OFFICE
CERTIFICATE OF CORRECTION

PATENT NO. : 3,947,626
DATED : March 30, 1976
INVENTOR(S) : JEAN ROBERT PERILHOU ET AL It is certified that error appears in the above-identified patent and that said Letters Patent are hereby corrected as shown below:

```
                           1   1   1
                         2 1 2 1 2 1
                         312 312 312
                         423142314231
Ninth Partial            534253425342
Image Recorded           645364536453
(First partial           756475647564
Image of third           867586758675
Total Image              978697869786
Recorded)                 897 897 897
                           9 8 9 8 9 8
                             9   9   9
```

UNITED STATES PATENT AND TRADEMARK OFFICE
CERTIFICATE OF CORRECTION

PATENT NO. : 3,947,626
DATED : March 30, 1976
INVENTOR(S) : JEAN ROBERT PERILHOU ET AL It is certified that error appears in the above-identified patent and that said Letters Patent are hereby corrected as shown below:

Col. 8, line 64, "tupe" should be --type--;

<u>IN THE CLAIMS</u>

Claim 1, line 20, before "said tape" should be --means for moving--;

Signed and Sealed this

Thirteenth Day of July 1976

[SEAL]

*Attest:*

RUTH C. MASON
*Attesting Officer*

C. MARSHALL DANN
*Commissioner of Patents and Trademarks*